Dec. 5, 1933. C. A. SCHMIDT 1,937,597
VALVE
Filed Sept. 24, 1927
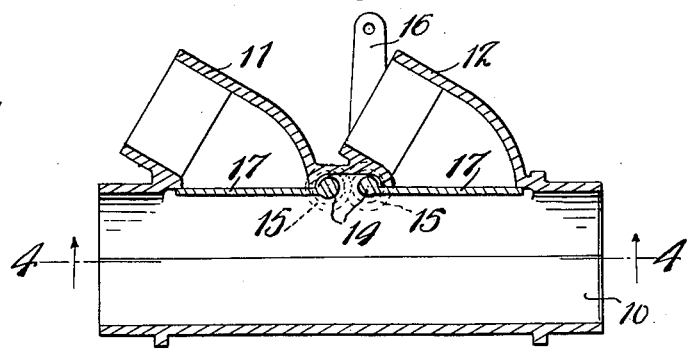
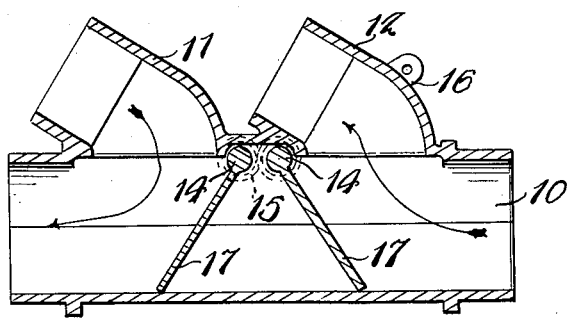
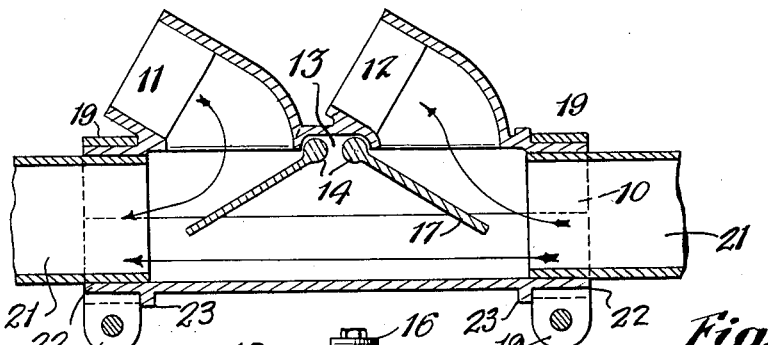
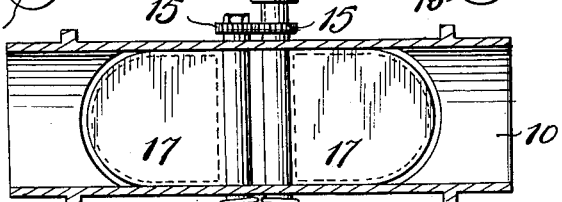
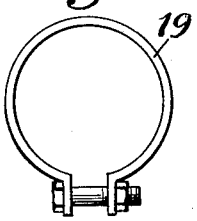
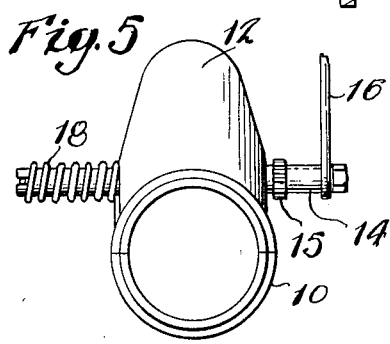
CARL A. Schmidt, Inventor
By Wm. L. Symons
his Attorney Patented Dec. 5, 1933

1,937,597

UNITED STATES PATENT OFFICE 1,937,597

VALVE

Carl A. Schmidt, Waterloo, Iowa, assignor to Ashco Corporation, St. Paul, Minn., a corporation of Minnesota Application September 24, 1927
Serial No. 221,694

5 Claims. (Cl. 277—19)

My invention relates to valves and especially to valves for diverting exhaust gases to a heater. An important object of my invention is the provision of a device of the above mentioned character which will divert the gases from the exhaust pipe of an internal combustion engine to a heater, and return them to the exhaust pipe.

Another object of my invention is to provide a device of this character in which the quantity of gases diverted to the heater may be varied at will without effecting the proper functioning of the valve.

Other objects and advantages of my invention will be apparent during the course of the following description.

In the accompanying drawing which forms a part of this specification and wherein like characters of reference denote like or corresponding parts throughout the same, Figure 1 is a vertical longitudinal sectional view of a valve casing embodying my invention, Figure 2 is a similar view showing the valve in open or operative position, Figure 3 is a similar view showing the valve in its intermediate position, Figure 4 is a horizontal section on the line 4—4 of Figure 1, Figure 5 is an end elevation of the valve casing, and, Figure 6 is an elevation of one of the clamping members used to secure the valve casing to the exhaust pipe (not shown).

In the drawing wherein for the purpose of illustration is shown a preferred embodiment of my invention, the numeral 10 designates a valve casing comprising upper and lower sections, the upper section being provided with spaced inlet and outlet pipe stubs 11 and 12, respectively. A substantially inverted U-shaped chamber 13 is arranged between the stubs 11 and 12, and spaced shafts 14 extend through this chamber, being journaled in the outer walls thereof and extending beyond the valve casing on both sides. Each of the shafts is provided with a pinion 15 arranged outside of the casing and intermeshing with the pinion on the other shaft. The end of one of the shafts extends beyond the pinion and is provided with an operating lever 16.

Valve members 17 are secured to the shafts 14 and extend in opposite directions. These valves when closed shut off the entrance to the pipe stubs 11 and 12 and are normally held in this position by means of coiled springs 18 arranged on the ends of the shafts exteriorly of the casing.

The valve casing is securing to an exhaust pipe of an automobile by means of clamping rings 19 shown in Figure 6.

In securing the valve to the exhaust pipe, the end of the exhaust pipe 20 leading from the exhaust manifold on the engine is inserted into one end of the casing, and the pipe 21 leading to the muffler is inserted into the other end. The clamps 19 are then tightened about the ends 22 of the casing 10. The clamps 19 are limited in their insertion onto the ends by the circumferential flanges 23. The pipes 20 and 21 are thus securely clamped between the halves of the split casing 10.

When the lever 16 is moved, the shafts are rotated an equal distance in opposite directions by reason of the pinions 15. When the valves are completely open, as in Figure 1 they are inclined, and the gases entering the stub 12 are not broken up by a right angular bend, as in the usual valves. The stub 12 is connected to the inlet end of a heater, while the stub 11 is connected to the outlet end of the heater. The gases go through the heater and are returned to the exhaust pipe by means of the stub 11. The valves are inclined in the direction of travel of the gases, and consequently do not tend to break them up or reduce their velocity. When the valves are open, they completely close the exhaust pipe and all of the gases are deflected to the heater and returned to the exhaust pipe.

In the event that all of the gases are not needed in the heater the valves may be partially opened, as in Figure 3 and the returned gases will be sucked into the exhaust pipe by the gases which are not deflected, as illustrated by the arrows in Figure 3. The gases not entering the heater are unable to pass into the heater exhaust 11, and consequently cannot retard circulation to and from the heater, and serve to assist the circulation.

The gases being deflected at an obtuse angle, are not broken up and consequently are delivered to the heater at the highest velocity obtainable, and the highest possible temperature of the gases is maintained.

While I have shown and described the preferred embodiment of my invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. A valve comprising a valve casing having upper and lower sections, clamps for holding said sections together and in connection with connecting tubing, said upper section having spaced inlet and outlet pipes inclined with respect thereto, and gate valves journaled between said inlet and outlet pipes and adapted to normally close the open ends of the pipes, resilient means holding the valves in their normal closed position, means to simultaneously operate said valves against the tension of the resilient means, and means whereby the valves will completely obstruct the valve casing in their extreme open positions and will be arranged in an inclined position, said inclination being in the direction of travel of the medium passing through the casing and pipes to deflect the incoming gases at an obtuse angle.

2. A valve comprising a valve casing having spaced inlet and outlet pipes inclined with respect thereto, said casing having a recessed portion arranged between the inlet and outlet pipes, a substantially U-shaped recess centrally disposed in said recessed portion, a pair of spaced shafts journaled in said U-shaped recess, a valve secured to each of said shafts and extending in opposite directions and normally covering the open ends of the inlet and outlet pipes, resilient means on said shafts normally forcing the valves against the inlet and outlet pipes, and means to simultaneously rotate said shafts in opposite directions to open the valves, said valves being of a size and shape whereby they will completely obstruct said valve casing when in their extreme open position and will be in an inclined position, said inclination being in the direction of travel of the medium flowing through said valve casing and pipes.

3. A valve including, a divided casing, a pair of spaced inclined elbows projecting from said casing, circumferential flanges about said casing spaced from the ends thereof, clamps for holding the parts of said casing together, a pair of shafts extending through said casing between said spaced elbows, valve means on said shafts, means connecting said shafts to permit the same to operate in unison, and spring means on the extended ends of the shafts for holding said valve means in one extreme position.

4. A valve including, a casing having inlet and outlet ends, a recessed portion inside said casing having arcuated ends and straight sides, spaced elbow members extending from the rounded ends of said recessed portion, a pair of parallel shafts extending through said casing between said elbows, and valve means on said shafts adapted to be positioned in said recessed portion to close the elbow openings.

5. A valve including, a casing, inlet and outlet ends thereupon, spaced elbow members formed on said casing, valves pivotal simultaneously to close the openings of said elbows into said casing, a recessed portion in said casing to allow said valves to clear the passageway when said valves are covering the elbow openings and a central U-shaped recess adjacent said recessed portion to accommodate the pivoting ends of said valves.

CARL A. SCHMIDT.